(12) United States Patent
Pedersen et al.

(10) Patent No.: US 10,941,636 B2
(45) Date of Patent: Mar. 9, 2021

(54) DRILLING OR WORK-OVER RIG COMPRISING AN OPERATIONAL CONTROL AND/OR STATE UNIT AND A COMPUTER-IMPLEMENTED METHOD OF PROVIDING OPERATIONAL CONTROL AND/OR STATE

(71) Applicant: MAERSK DRILLING A/S, Kgs. Lyngby (DK)

(72) Inventors: John Røn Pedersen, Frederikssund (DK); Jesper Holck, Humlebaek (DK)

(73) Assignee: MAERSK DRILLING A/S., Kgs. Lyngby (DK)

( * ) Notice: Subject to any disclaimer, the term of this patent is extended or adjusted under 35 U.S.C. 154(b) by 79 days.

(21) Appl. No.: 15/763,099

(22) PCT Filed: Sep. 26, 2016

(86) PCT No.: PCT/DK2016/000034
§ 371 (c)(1),
(2) Date: Mar. 24, 2018

(87) PCT Pub. No.: WO2017/050335
PCT Pub. Date: Mar. 30, 2017

(65) Prior Publication Data
US 2018/0274338 A1   Sep. 27, 2018

(30) Foreign Application Priority Data
Sep. 24, 2015 (GB) ...................................... 1516948

(51) Int. Cl.
*E21B 7/12* (2006.01)
*E21B 41/00* (2006.01)
(Continued)

(52) U.S. Cl.
CPC ...... *E21B 41/0092* (2013.01); *B63B 35/4413* (2013.01); *B63B 79/00* (2020.01);
(Continued)

(58) Field of Classification Search
CPC .... E21B 41/0092; E21B 47/0001; E21B 7/12; E21B 41/0007; E21B 44/00;
(Continued)

(56) References Cited

U.S. PATENT DOCUMENTS 4,317,174 A * 2/1982 Dean ................... E21B 41/0014
114/264
5,978,739 A * 11/1999 Stockton ............... E21B 19/002
701/116

(Continued)

FOREIGN PATENT DOCUMENTS

| EP | 0046800 A1 | 3/1982 |
|---|---|---|
| EP | 2302479 A2 | 3/2011 |
| WO | WO 2014/160561 A1 | 10/2014 |

OTHER PUBLICATIONS

PCT/DK2016/000034 International Search Report and Written Opinion dated Feb. 10, 2017, 10 pp.

*Primary Examiner* — Matthew R Buck
(74) *Attorney, Agent, or Firm* — Lathrop GPM LLP

(57) ABSTRACT

A drilling or work-over vessel (10) is disclosed comprising a number of operational equipment (300), wherein the drilling or work-over vessel comprises at least one operational control and/or state unit (100) comprising at least one processing unit (102), wherein the at least one operational control and/or state unit (100) comprises or are in connection with a memory and/or storage (103), and at least one sensor unit (200), wherein the at least one sensor unit (200) is adapted to obtain one or more measured physical values and to provide data representing the one or more measured physical values and/or derived values thereof to the at least
(Continued)

one operational control and/or state unit (100), the memory and/or storage (103) comprises a data representation of a computational physics model of at least a part of the drilling or work-over rig, and the at least one processing unit (102) is adapted to derive data representing an estimation of one or more physical states (such as defined by limits of forces, relative motion between operational equipment and vessel, or between other two pieces of operational equipment) estimated to act on at least one operational equipment (300) in response to the data representing the one or more measured physical values and/or derived values thereof as provided by the at least one sensor unit (200).

16 Claims, 2 Drawing Sheets

(51) Int. Cl.
| | |
|---|---|
| *E21B 44/00* | (2006.01) |
| *E21B 47/001* | (2012.01) |
| *B63B 35/44* | (2006.01) |
| *B63B 79/00* | (2020.01) |
| *G06Q 10/00* | (2012.01) |
| *G06Q 50/02* | (2012.01) |

(52) U.S. Cl.
CPC ............ *E21B 7/12* (2013.01); *E21B 41/0007* (2013.01); *E21B 44/00* (2013.01); *E21B 47/001* (2020.05); *G06Q 10/20* (2013.01); *G06Q 50/02* (2013.01)

(58) Field of Classification Search
CPC ... E21B 47/001; C06Q 10/20; B63B 35/4413; B63B 79/00; G06Q 10/20
See application file for complete search history.

(56) References Cited

U.S. PATENT DOCUMENTS

| | | | |
|---|---|---|---|
| 7,080,689 B2* | 7/2006 | Guesnon | ................ E21B 17/01 |
| | | | 166/355 |
| 8,074,720 B2* | 12/2011 | Radi | ..................... E21B 19/004 |
| | | | 166/350 |
| 10,378,331 B2* | 8/2019 | Alliot | .................... E21B 17/012 |
| 2006/0065401 A1 | 3/2006 | Allen et al. | |
| 2007/0250227 A1 | 10/2007 | Fossen et al. | |
| 2009/0277644 A1 | 11/2009 | McStay et al. | |
| 2012/0173218 A1 | 7/2012 | Shafer et al. | |
| 2012/0179428 A1 | 7/2012 | Dykstra et al. | |
| 2015/0149135 A1* | 5/2015 | Tervo | ..................... B63B 71/00 |
| | | | 703/8 |
| 2015/0149136 A1* | 5/2015 | Tervo | ..................... G06F 30/15 |
| | | | 703/8 |

* cited by examiner

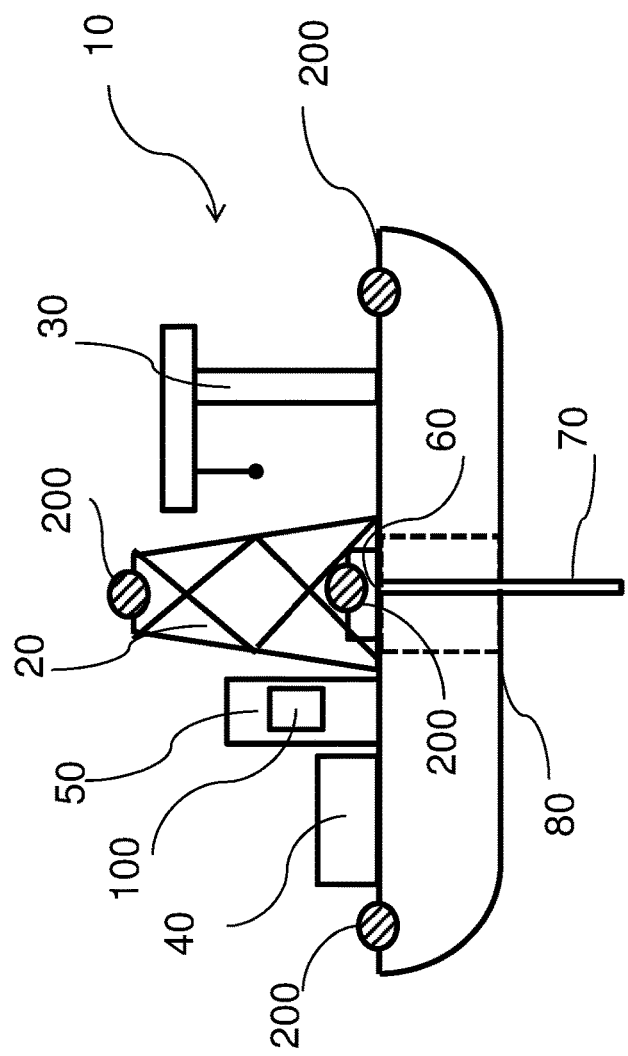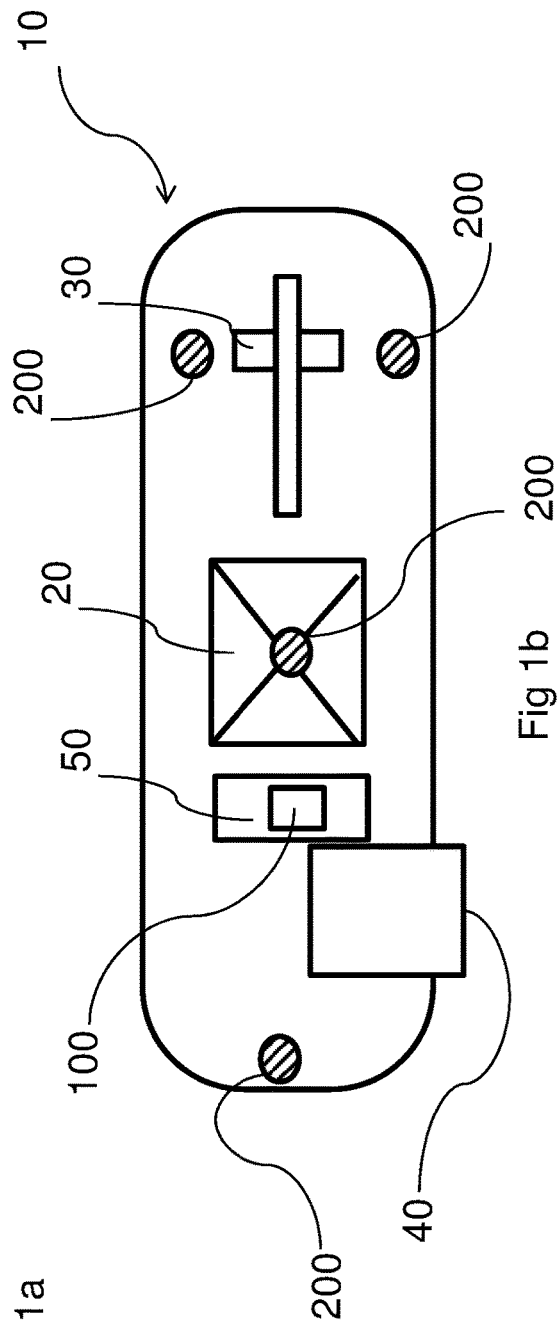

DRILLING OR WORK-OVER RIG COMPRISING AN OPERATIONAL CONTROL AND/OR STATE UNIT AND A COMPUTER-IMPLEMENTED METHOD OF PROVIDING OPERATIONAL CONTROL AND/OR STATE

CROSS REFERENCE TO RELATED APPLICATIONS

This is a 35 U.S.C. § 371 filing of International Application No. PCT/DK2016/000034, filed Sep. 26, 2016, which claims priority to United Kingdom Patent Application No. GB1516948.5, filed Sep. 24, 2015, the entire content of each application is hereby incorporated by reference into this application.

FIELD

Described examples relate to vessels, and control systems and methods for those vessels, such as drilling or work-over vessels, and the like.

BACKGROUND

Sea-going drilling/work-over rigs (e.g. offshore vessels) are typically used when performing oil and gas operations offshore.

To ensure that a rig is suitable for performing a given operation in its environment an operational manual may define operational windows of wind speeds, currents and/or wave heights for which a given operation is safe.

Due to the complexity of the rig as a sea-going vessel, its equipment, the operations as well as the particulars of the location, the operational window or so-called envelope may be difficult to define. In fact, the operational envelope of such equipment is generally not well-defined or well understood by the operators of the equipment. As a result, operational equipment may be shut-down and operations suspended well before approaching the limits of safe operation of the equipment—or worse, causing the equipment to be used beyond its dynamic design limits.

The offshore installation manager (OIM) or captain of the vessel is typically responsible for determining whether a particular operation is safe or not.

SUMMARY

There are described vessels, systems and methods for use with operational equipment, and in particular for enabling safer, and/or more optimal use of that operational equipment.

In one example, there is described a vessel, such as a drilling or work-over vessel (i.e. drilling or work-over rig). The vessel may comprise sensor units configured to obtain measured physical values, and to provide data representing those measured physical values. The vessel may also comprise multiple operational equipment configured for use in offshore operations, such as drilling or work-over operations. Further, the vessel may comprise a control system configured to receive data representing the measured physical values from the sensor units. The control system may be further configured to use a computational physics model of at least part of the vessel (e.g. including the operational equipment) so as to derive data representing an estimation of one or more physical states of the operational equipment.

Such a computational physics model may be usable to translate data representing measured physical values at a sensor unit remote from a particular operational equipment to physical values that may be experienced at that operational equipment. Such a computational physics model may be usable to provide an estimation of the dynamic operation of operational equipment at the vessel, e.g. forces, position or displacements, velocities, and/or accelerations of equipment.

Some of the sensor units may be configured to obtain physical values associated with the vessel itself, such as pitch and roll, acceleration, positional information (e.g. from GPS, or the like). In such cases, those sensor units may be provided with the vessel for further vessel sub-systems, such a navigation, control, etc. In other words, those sensor units may be installed/incorporated with the vessel, irrespective of the operational equipment. Similarly, in some examples, some of the sensor units may be configured to obtain physical values relating to environmental conditions associated with the vessel, such as near-water current values, wind speeds, etc. Again, such sensor units may be installed/incorporated irrespective of the operational equipment. In some other examples, some of the sensors units may be configured to obtain physical values associated with operational equipment. In other words, those sensor units may be provided together with the operational equipment. In those cases, those sensor units may be configured to provide data specifically regarding the conditions at the operational equipment.

In some examples, the control system may be configured to receive data from sensor units associated with the vessel together with data from sensor units associated with operational equipment. In other examples, the control system may be configured to receive data solely from sensor units associated with the vessel. The control system may be configured to derive data representing an estimation of one or more physical states of the operational equipment, without receiving data from sensor units associated with that operational equipment.

Some of the operational equipment may be permanently installed with the vessel, while some may be temporary. By being temporarily installed, it may be that the position of the equipment is not fixed at the vessel, and can be repositioned at the vessel (e.g. repositioned at the deck), or indeed that the equipment may or may not be installed at the vessel depending on operational requirements at the time. In some examples, it may be that the position of operational equipment at the vessel may vary, depending on operations. As such, the computational physics model may relate to the present location and/or configuration of the operational equipment. Further, the computational physics model may be reconfigurable in order to relate to the different locations and/or configuration of the operational equipment.

The model may comprise information relating specifically to the present operational equipment installed at the vessel, such as the operating envelopes or limitations for operational equipment. The model may comprise information relating specifically to the relative positioning of operational equipment (e.g. relative to each other, relative to the vessel, etc.). For example, the model may define the spatial relationship of operation equipment, e.g. the spatial relationship between a riser and moonpool.

The physical states of the operational equipment may provide an indication as to the operability of the operational equipment, based on data received from the sensor units. In other similar words, the physical state may provide an indication as to whether, or to what extent, the operational equipment may be operable within an operational window (e.g. a safe/optimal window).

The physical states may comprise an indication as to whether the equipment is operable in normal operation; cautionary operation; reduced operation (e.g. reduced speed and/or load); stop operation; disconnect operation, or the like. In other similar words, the physical states may be defined by a general or generalized operational state.

The control system may be configured to use the computational physics model to derive data representing an estimation of the "present" physical state of the operational equipment. That is to say that the control system may be configured to derive data that could indicate whether operational equipment is presently operable in normal operational state, or a stop state, or the like. In other similar words, the control system may be configured to derive data representing an estimation of one or more physical states of the operational equipment in real time.

The physics model may allow the control system to approximate forces, velocities, accelerations, displacements, positions, or other conditions, at operational equipment based on data from the sensor units. The physical model may allow for those conditions to be translated or otherwise extrapolated from data from sensor units not associated with the particular operational equipment. In other words, the physical model may permit an approximate or estimate condition at operational equipment, based on data derived from a sensor unit remote from that operational equipment.

In such a way, the control system can utilize fully or partially the sensor units associated with the vessel, without the need to incorporate bespoke sensor units at equipment. Further, in some examples, not all equipment may have sensor units, but rather only some. In those cases, the control system may be configured to translate data to operational equipment without sensor units, using the physical model. The control system may be configured to use data fusion techniques from multiple sensor units in order to derive data representing an estimation of one or more physical states of the operational equipment.

In some examples, the physical state may be derived from an estimation as to the limits of forces experienced by certain equipment, relative motion between operational equipment and rig, or between two or more operational equipment. In similar words, the physical state may include an indication of any interaction with the other operational equipment or the vessel. For example, the physical state may be based on the likelihood of clashing with other equipment or the vessel (e.g. potential clashing between a riser and the moonpool, based on data from sensor units).

In some examples, additionally, or alternatively, the estimated physical state may include the "future" state of operation equipment. For example, the future state may relate to an estimation as to the state of that equipment in predefined time in the future, e.g. 30 mins, 1 hour, 2 hours, 4 hours, 6 hours, 12 hours, or the like. In other similar words, the control system may be configured to estimate, using the present data received from the sensor units, the present state and/or the future state of the equipment at some time (e.g. predefined time) in the future.

In some cases, the control system may be configured to derive an expected duration of state for operation equipment. In other similar words, the control system may be configured to derive data indicating how long a particular operational equipment is expected to remain in a particular state.

In some examples, the control system may be configured to estimate, using the present data received from the sensor units together with previous data (e.g. from sensor units), one or more future physical states/duration of state of the operational equipment. In other similar words, the control system may be configured to forecast the future state based on the present data together with historical data. For example, the control system may be configured to extrapolate present data and historical data in order to forecast the future state.

In some examples, the control system may be configured to derive data representing an optimized operation for the vessel/operational equipment. The optimized operation may based on the estimated future physical state. Such an optimized operation may define or redefine a particular sequence of operation, a particular orientation or positional movement of the vessel, or the like. Such an optimized operation may seek to increase or maximize intervals between overhaul or maintenance of operational equipment. For example, the control system may permit decisions to "derate" equipment for reduced speed/loading as necessary to reduce wear and tear.

The control system may comprise at least one operational control and/or state unit comprising at least one processing unit. The at least one operational control and/or state unit may comprise, or be in connection with, a memory and/or storage. The memory and/or storage may comprise the data representation of a computational physics model of at least a part of the drilling or work-over rig. The at least one processing unit may be adapted to derive data representing an estimation of one or more physical states.

In some examples, there is described a control system, for example, for a drilling or work-over vessel/rig. The control system may be configured to receive data representing the measured physical values from sensor units; and further configured to use a computational physics model of at least part of the vessel so as to derive data representing an estimation of one or more physical states of operational equipment positioned at the vessel, such operational equipment configured for drilling or work-over operations.

In some examples, there is described a vessel, such as a drilling or work-over vessel, comprising;
  sensor units configured to obtain measured physical values, and to provide data representing those measured physical values;
  multiple operational equipment configured for use in drilling or work-over operations; and
  a control system configured to receive data representing the measured physical values from the sensor units; and further configured to use a computational physics model of at least part of the vessel so as to derive data representing an estimation of one or more physical states of the operational equipment.

In some examples, there is described a method of operation of a vessel, such as a drilling or work-over vessel. Such vessels may have multiple operational equipment.

The method may comprise obtaining data from sensor units, that data representing measured physical values. The method may further comprise using a computational physics model of at least part of the vessel so as to derive data representing an estimation of one or more physical states of the multiple operational equipment at the vessel.

The method may comprise translating data representing measured physical values at a sensor unit remote from a particular operational equipment to physical values that may be experienced at that operational equipment.

The method may comprise obtaining data from sensor units associated with the vessel itself, such as pitch and roll, acceleration, positional information (e.g. from GPS, or the like). The method may comprise obtaining data from sensor units relating to environmental conditions associated with the vessel, such as near-water current values, wind speeds, etc. The method may comprise obtaining data from sensor units associated with operational equipment.

The method may comprise obtaining data from sensor units associated with the vessel together with data from sensor units associated with operational equipment. In other examples, the method may comprise receiving data solely from sensor units associated with the vessel. The method may comprise deriving data representing an estimation of one or more physical states of the operational equipment, without receiving data from sensor units associated with that operational equipment.

The method may comprise using the computational physics model to derive data representing an estimation of the "present" physical state of the operational equipment. That is to say that the method may comprise deriving data that could indicate whether operational equipment is presently operable in normal operational state, or a stop state, or the like (e.g. in real time).

In doing so, the method may comprise using the physics model to approximate forces, accelerations, displacements, positions, such as relative positions, or other conditions, of operational equipment based on data from the sensor units. The method may comprise using the physical model to translate or otherwise extrapolate from data from sensor units not associated with the particular operational equipment. In other words, the physical model may permit an approximate or estimate condition at operational equipment, based on data derived from a sensor unit remote from that operational equipment.

The method may comprise fusing data from multiple sensor units in order to derive data representing an estimation of one or more physical states of the operational equipment.

The method may comprise estimating the physical state based on an estimation as to the limits of forces experienced by certain equipment, relative motion between operational equipment and rig, or between two or more operational equipment.

The method may comprise deriving data representing an estimated "future" physical state of operation equipment. For example, the future state may relate to the state of that equipment in a predefined time, e.g. 30 mins, 1 hour, 2 hours, 4 hours, 6 hours, 12 hours, or the like. In other similar words, the method may comprise estimating, using the present data received from the sensor units, the present state and/or the future state of the equipment.

In some cases, the method may comprise deriving an expected duration of state for operation equipment. In other similar words, the method may comprise deriving data indicating how long a particular operational equipment is expected to remain in a particular state (e.g. 30 mins, 1 hr, 3 hrs, 5 hrs, or the like).

In some examples, the method may comprise estimating, using the present data received from the sensor units together with previous data from sensor, one or more future physical states/duration of state of the operational equipment. In other similar words, the method may comprise forecasting the future state based on the present data together with historical data. For example, the method may comprise extrapolating present data and historical data in order to forecast the future state.

In some examples, the method may comprise deriving data representing an optimized operation for the vessel/operational equipment, based on estimated future physical state. Such an optimized operation may define or redefine a particular sequence of operation, a particular orientation or positional movement of the vessel, or the like.

In some examples, there is described a method of operation of a drilling or work-over vessel having multiple operational equipment, the method comprising:
  obtaining data from sensor units, that data representing measured physical values;
  using a computational physics model of at least part of the vessel so as to derive data representing an estimation of one or more physical states of the multiple operational equipment at the vessel.

In some examples, there is described a system for a drilling or work-over vessel, the vessel comprising a number of operational equipment, wherein the drilling or work-over rig comprises
  at least one operational control and/or state unit comprising at least one processing unit, wherein the at least one operational control and/or state unit comprises or are in connection with a memory and/or storage, and
  at least one sensor unit,
wherein
  the at least one sensor unit is adapted to obtain one or more measured physical values and to provide data representing the one or more measured physical values and/or derived values thereof to the at least one operational control and/or state unit,
  the memory and/or storage comprises a data representation of a computational physics model of at least a part of the drilling or work-over vessel, and
  the at least one processing unit is adapted to derive data representing an estimation of one or more physical states (such as defined by limits of forces, relative motion between operational equipment and rig, or between other two pieces of operational equipment) estimated to act on at least one operational equipment in response to the data representing the one or more measured physical values and/or derived values thereof as provided by the at least one sensor unit.

Accordingly, in some examples, there is described, a drilling or work-over vessel comprising a number of operational equipment, wherein the drilling or work-over vessel comprises
  at least one operational control and/or state unit comprising at least one processing unit, wherein the at least one operational control and/or state unit comprises or are in connection with a memory and/or storage, and
  at least one sensor unit,
wherein
  the at least one sensor unit is adapted to obtain one or more measured physical values and to provide data representing the one or more measured physical values and/or derived values thereof to the at least one operational control and/or state unit,
  the memory and/or storage comprises a data representation of a computational physics model of at least a part of the drilling or work-over vessel, and
  the at least one processing unit is adapted to derive data representing an estimation of one or more physical states (such as defined by limits of forces, relative motion between operational equipment and rig, or between other two pieces of operational equipment) estimated to act on at least one operational equipment in response to the data representing the one or more measured physical values and/or derived values thereof as provided by the at least one sensor unit.

The at least one processing unit may be adapted to derive data representing an estimation of one or more physical forces estimated to presently act on at least one operational equipment in response to the data representing the one or more measured physical values and/or derived values thereof as provided by the at least one sensor unit.

The at least one processing unit may be adapted to derive data representing an estimation of one or more physical forces estimated to act on at least one operational equipment within a predetermined near-future period of time in response to the data representing the one or more measured physical values and/or derived values thereof as provided by the at least one sensor unit.

The at least one processing unit may be adapted to provide data representing a state of at least one given operational equipment in response to the derived data representing an estimation.

The "state" may comprise one or more selected from the group of: normal operation, cautionary operation, proceed operation with a lower than normal operational speed/load, and stop operation.

The at least one processing unit may be adapted to provide data representing a control signal for at least one given operational equipment in response to the derived data representing an estimation.

The at least one processing unit may be adapted to provide data representing a state and/or a control signal for at least one operation involving a plurality of operational equipments.

The at least one processing unit may be adapted to provide data representing a maximum operational speed limit for a given operational equipment.

The at least one sensor unit may be one or more selected from the group of:
a pitch and roll sensor,
a motion reference unit,
a gyroscope,
an accelerometer,
a global positioning system or other positioning sensor,
a weather station,
a wind sensor,
an inertial measurement unit,
a near surface water current measurement unit,
a near seabed water current measurement unit,
a Doppler water current sensor,
a single-point water current meter,
a water current profiler unit,
a vessel water current sensor,
a water current sensor located on a marine riser,
Riser management system,
Doppler radar,
Data and/or state information of control systems such as the balast system, dynamic positioning system, active heave compensation systems of the hoisting system for the well center(s) (e.g. an active heave compensation drawworks, hydraulic cylinders hoisting system, crown mounted heave compensators, marine riser tensioning systems etc.), active heave compensation systems for cranes.

The at least one operational equipment may be one or more selected from the group of:
a pipe racking equipment,
tubular handling- and guiding equipment
a crane or other lifting and/or hoisting equipment,
a blowout preventer,
at least one equipment hanging off of the drilling or work-over rig and in the water (such as in a splash zone, at certain depths such as about 10 to about 100 meters+ interval op till 3 km or beyond), near the seabed (such as about within 1 meter, within 5 meters, within 10 meters, within 20 meters, within about 50 to about 100 meters), blowout preventer, marine riser, and/or X-mas tree,
active or passive heave compensation equipment.

The operational control and/or state unit may be comprised by an existing unit located on the drilling or work-over vessel.

According, in some examples, there is described a computer-implemented method of providing operational control and/or state is provided, wherein the method comprises
obtaining one or more measured physical values from at least one sensor unit,
providing data representing the one or more measured physical values and/or derived values thereof to at least one operational control and/or state unit,
deriving, by at least one processing unit, data representing an estimation of one or more physical states (such as defined by limits of forces, relative motion between operational equipment and vessel, or between other two pieces of operational equipment) estimated to act on at least one operational equipment presently or within a predetermined near-future period of time in response to the data representing the one or more measured physical values and/or derived values thereof as provided by the at least one sensor unit, and
a data representation of a computational physics model of at least a part of the drilling or work-over vessel stored in a memory and/or storage accessible by the at least one processing unit.

In some embodiments, the method carries out one or more functions of a drilling or work-over rig as described elsewhere.

There may also be provided a computer program product that when programmed into a suitable controller configures the controller to perform any methods disclosed herein. There may be provided a carrier medium, such as a physical or tangible and/or non-transient carrier medium, comprising the computer program product. The carrier medium may be a computer readable carrier medium.

The invention may include one or more corresponding aspects, embodiments or features in isolation or in various combinations whether or not specifically stated (including claimed) in that combination or in isolation. As will be appreciated, features associated with particular recited embodiments relating to systems, vessels, etc. may be equally appropriate as features of embodiments relating specifically to methods of operation or use, and vice versa.

It will be appreciated that one or more embodiments/aspects may be useful in improving the ability with which to perform operations using vessels.

For example, when a drilling or work-over vessel is provided, this may enable physical modelling of the drilling or work-over vessel (or parts thereof) in response to a number of supplied parameters (e.g. measured physical values) whereby it is possible to estimate present or future states of the drilling or work-over vessel or parts thereof. In particular, it may also be possible to estimate present or (e.g. near-)future states of one or more of the operational equipment.

This may enable more optimal use of the operational equipment while still maintaining safety. Specifically, operational equipment may accordingly be used safely at full speed, safely at reduced speed and/or load, etc. whereas it perhaps would not have been used according to other schemes not deriving/estimating the actual present or future state of the operational equipment (and/or the forces estimated to act on it). This enables greater usage of the operational equipment.

The operational limitations in terms of maximum dynamic loading of various equipment may be defined by the equipment operational design envelope, so based on motions of the ship and the operation at hand it can be calculated whether a given operation is safe, unsafe, safe at reduced speed or safe but risking excessive wear on the equipment.

The above summary is intended to be merely exemplary and non-limiting.

BRIEF DESCRIPTION OF THE DRAWINGS

FIG. 1a schematically illustrates a side view of a vessel, such as a drilling or work-over vessel/rig; and FIG. 1b schematically illustrates a plan view of that vessel;

DETAILED DESCRIPTION

Figure 2:
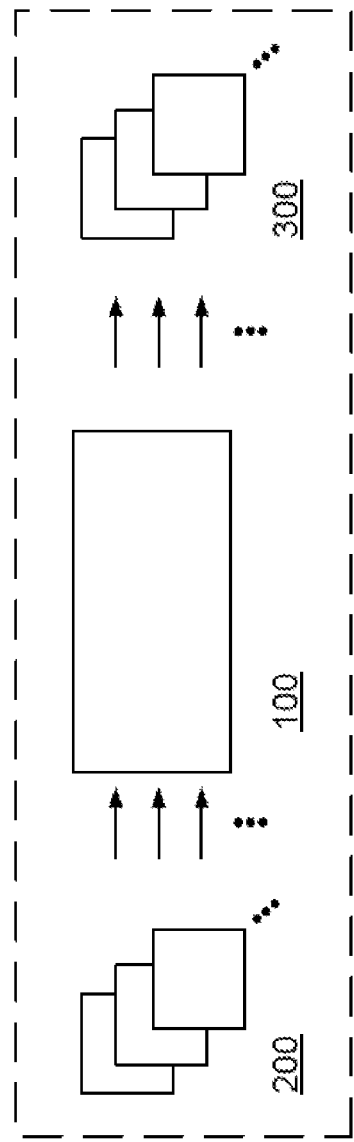
FIG. 2 schematically illustrates one embodiment of a work-over or drilling rig comprising at least one operational control and/or state unit, at least one sensor unit, and at least one operational equipment, and FIG. 3 schematically illustrates a functional block diagram of one embodiment of an operational control and/or state unit, such as the one shown in FIG. 2.

Various aspects and embodiments of a vessels, control systems, and methods will now be described with reference to the figures. Some examples described a drilling or work-over vessel comprising at least one control system having an operational control and/or state unit and a computer-implemented method of providing operational control and/or state.

For ease of explanation, the following examples have been described with reference to oil and gas drilling or work-over rigs/vessels. However, it will readily be appreciated that the systems and methods described herein may be equally used and may be applicable in respect of vessels used for other offshore operations (e.g. pipe laying, or the like). A skilled reader will readily be able to implement those various alternative embodiments accordingly. It will also be apparent to a skilled reader that the term "vessel" may include platforms, semi-submersibles, mobile offshore drilling units, and other such mobile sea-going vessels.

When relative expressions such as "upper" and "lower", "right" and "left", "horizontal" and "vertical", "clockwise" and "counter clockwise" or similar are used in the following terms, these refer to the appended figures and not necessarily to an actual situation of use. The shown figures are schematic representations for which reason the configuration of the different structures as well as their relative dimensions are intended to serve illustrative purposes only.

Some of the different components are only disclosed in relation to a single embodiment of the invention, but is meant to be included in the other embodiments without further explanation.

FIG. 1a shows a simplified side representation of a vessel 10, and in particular a drilling or work-over vessel 10. It will be appreciated that during offshore operations, the vessel 10 may be fitted with operational equipment for use during those operations. Typically, some of the operational equipment is permanently installed at the vessel 10, whereas there may also be bespoke or dedicated equipment depending on the expected operation. Further some of the operational equipment may be relocatable about the vessel 10, depending on operations.

Here, in FIG. 1a, the vessel 10 is shown having—as operational equipment—a derrick 20 (which may be dynamic), a crane 30, a pipe rack 40; heave compensation equipment 60, and a riser section 70 (e.g. for drilling or work-over operations), which passes through a moonpool 80, in a known manner. The vessel 10 here also comprises a control tower 50 where, for example, a driver such as a captain, or other operational crew may be located. Additionally, the vessel 10 comprises a plurality of sensor units 200 that, as will be explained, are configured to obtain measured physical values, and to provide data representing those measured physical values.

Some of the sensor units 200 may be configured to obtain physical values associated with the vessel 10 itself, such as pitch and roll, acceleration, positional information (e.g. from GPS, or the like). In such cases, those sensor units 200 may be provided with the vessel 10 for further vessel subsystems, such a navigation, control, etc. In other words, those sensor units 200 may be considered to have been installed/incorporated with the vessel 10 itself.

Similarly, in some examples, some of the sensor units 200 may be configured to obtain physical values relating to environmental conditions associated with the vessel, such as near-water current values, wind speeds, etc., as would be appreciated by a skilled reader. Again, those sensor units 200 may be installed/incorporated irrespective of the operational equipment at the vessel. In this example, and as shown in FIG. 1a, some of the sensors units 200 are also provided with operational equipment, in this case the derrick 20 and heave compensation equipment 60. Here, those sensor units 200 are configured to provide data specifically regarding the conditions at that operational equipment 20, 60.

FIG. 1b shows a plan view of the vessel 10 of FIG. 1a. As is apparent, the operation equipment at the vessel 10 has a spatial relationship (e.g. relative to the each other, the vessel 10 and the sensor units 200). As mentioned above, some of the operational equipment may be permanently installed with the vessel 10, while some may be temporary, and so the relative position or the type of equipment may vary depending on application.

In FIGS. 1a and 1b, the vessel 10 here further comprise a control system 100 configured to receive data representing the measured physical values from the sensor units 200. As will be explained in further detail below, the control system 100 is configured to use a computational physics model of at least part of the vessel 10 so as to derive data representing an estimation of one or more physical states of the operational equipment.

FIG. 2 schematically illustrates a simplified representation of the work-over or drilling rig/vessel 10 comprising the control system 100, sensor units 200, and operational equipment 300 (e.g. riser 70, crane 30, etc.). In this example, the control system 100 may be considered to be an operational control and/or state unit. The operational control and/or state unit 100 comprises or are in connection with a memory and/or storage (see e.g. 103 in FIG. 3).

Figure 3:
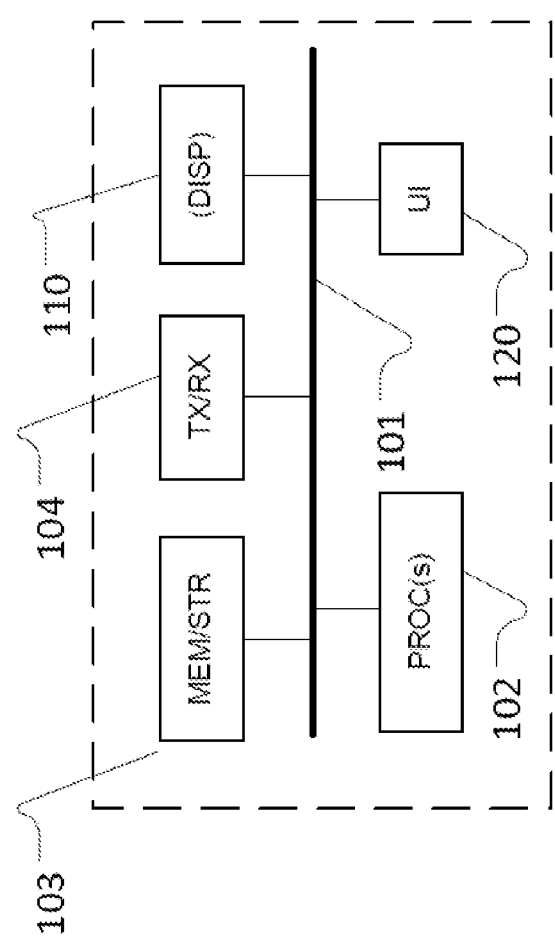

FIG. 3 schematically illustrates a functional block diagram of one embodiment of an operational control and/or state unit, such as the one shown in FIG. 2. Shown is an operational control and/or state unit 100 suitable for carrying out one or more of the functionalities described throughout this description comprising one or more processing units 102 connected via one or more communications and/or data buses 101 to a memory and/or storage 103, one or more transmitter and receiver communications elements 104 for communicating via a suitable communications network, an optional display 110, and optionally one or more (physical) user interface elements 120 (e.g. for positioning at the control tower 50). It should be noted, that the operational control and/or state unit 100—or another appropriate processing unit—may receive data from a computer readable medium (as indicated in connection with FIG. 2) to be able to execute the method (also indicated in connection with FIG. 2).

As mentioned, the sensor unit 200 is adapted to obtain one or more measured physical values and to provide data representing the one or more measured physical values and/or derived values thereof to the operational control and/or state unit(s). Here, the memory and/or storage (see e.g. 103 in FIG. 3) comprises a data representation of the computational physics model of at least a part of the drilling or work-over vessel 10. This enables physical modelling of the drilling or work-over vessel in response to a number of supplied parameters (e.g. measured physical values) whereby it is possible to estimate present or (e.g. near-) future states of the drilling or work-over vessel 10 or parts thereof. In particular, it is possible also to estimate present or future states of one or more of the operational equipment 300.

The model may comprise information relating specifically to the present operational equipment 300 installed at the vessel 10, which may include the operating envelopes or limitations for operational equipment. The model may comprise information relating specifically to the relative positioning of operational equipment 300 (e.g. relative to either other, relative to the vessel, etc.). For example, the model may define the spatial relationship of operation equipment 300, e.g. the spatial relationship between a riser 70 and moonpool 80. Such a computational physics model may be usable to translate data representing measured physical values at a sensor unit 200 remote from particular operational equipment to physical values that may be experienced at that operational equipment. Such a computational physics model may be usable to provide an estimation of the dynamic operation of operational equipment 300 at the vessel 10, e.g. forces, position or displacements, velocities, and/or accelerations of equipment.

In particular, the at least one processing unit 102 of the control system 100 can be adapted to derive data representing an estimation of one or more physical forces estimated to act on at least one operational equipment 300 presently or within a predetermined near-future period of time using the data representing the one or more measured physical values and/or derived values thereof as provided by the at least one sensor unit 200.

By placing one or more sensor units 200 on operational equipment and/or receiving information from one or more sensor units 200 already typically located on a rig and using that data with the mathematical model it is possible to derive or estimate what forces or the like will act on the given operational equipment and/or what state it will be in, presently or in the (near-)future. From that it is possible to derive a suggested or recommended operational state for the given operational equipment presently or for the (near-)future that takes actual measured physical values and/or conditions into account.

This enables more optimal use of the operational equipment while still maintaining safety. Specifically, an operational equipment may accordingly be used safely at full speed, safely at reduced speed/load, etc. whereas it perhaps would not have been used according to other schemes not deriving/estimating the present or actual (near-) future state of the operational equipment (and/or the forces estimated to act on it). This enables greater usage of the operational equipment.

The at least one operational control and/or state unit 100 may derive data representing a state of at least one given operational equipment 300 in response to the data derived from the mathematical model. In some embodiments, the state is derived for an operation using one but often multiple operational equipments 300. The state may be presented to a controller and/or an operator e.g. at the operational equipment 300 and/or at a control centre (e.g. at the control tower 50). The state may comprise one or more selected from the group of: normal operation (e.g. associated with a green light indicator), cautionary operation (e.g. associated with a white light indicator), stop operation (e.g. associated with a yellow light indicator), and disconnect operation (e.g. associated with a red light indicator).

In some examples, at least one operational control and/or state unit 100 may derive data representing a state of proceeding operation with a lower than normal operational speed/load. For example, the system 100 may permit decisions to "derate" equipment for reduced speed/loading as necessary to reduce wear and tear. This may allow for an extension of time intervals between overhaul or maintenance of operational equipment 300.

In some embodiments, the at least one processing unit 102 is adapted to provide data representing a control signal for at least one given operational equipment 300 in response to the derived data representing an estimation. In this way, a given operational equipment may be controlled (at least to some extent).

In some embodiments, the at least one processing unit 102 is adapted to provide data representing a state and/or a control signal for at least one operation involving a plurality of operational equipments 300. This enables state and/or control of operations, tasks, etc. involving several operational equipments 300 working in conjunction. Such operations, tasks, etc. may e.g. be a drilling operation, blowout preventer (BOP) landing operation, Crane operations, ROV operations, Riser and BOP operations, landing and other handling of subsea X-mas trees etc.

In some embodiments, the at least one processing unit 102 is adapted to provide data representing a maximum operational speed and/or load limit for a given operational equipment 300. This governs and ensures safe operation.

The input supplied to the at least one operational control and/or state unit 100 may e.g. be one or more selected from the group of sensors and/or data from control systems below (or derived data based on these), the vessel model and operational limits of the equipment and current position of the equipment if it moves relative to the rig. Some equipment may be added for specific operations so its data must be provided whereas other equipment is substantially permanently installed but the operational limits may have to be revised as the equipment ages or if it is replaced or upgraded.

The output supplied from the at least one operational control and/or state unit 100 may e.g. be one or more selected from the group of: serial interface to another system, analog interface to another system, digital interface to another system, HMI to another system. This interface can control equipment or group of equipment to safe operation mode. This interface can be used as guidance and indication to operator to go to safe operation mode.

Furthermore, condition based maintenance (CBM) may utilize the data from the at least one operational control and/or state unit which can provide a record of the forces to which the equipment 300 has been exposed thus enabling better prediction of when the equipment may require maintenance.

In some embodiments, the at least one sensor unit 200 is/are one or more selected from the group of:
- a pitch and roll sensor,
- a motion reference unit,
- a gyroscope,
- an accelerometer,
- a global positioning system or other positioning sensor,
- a weather station,
- a wind sensor,
- an inertial measurement unit,
- a near surface water current measurement unit,
- a near seabed water current measurement unit,
- a Doppler water current sensor,
- a single-point water current meter,
- a water current profiler unit,
- a vessel water current sensor,
- a water current sensor located on a marine riser,
- Riser management system
- Doppler radar,
- Motion Reference Units (MRU (s), gyro compass, current measurements surface, current measurement in ocean down to 4000 m or beyond, wave high measurements, Doppler radar, weather station, shock sensor(s), equipment behaviour measurements,
- Data and/or state information of control systems such as the ballast system, dynamic positioning system, active heave compensation systems of the hoisting system for the well centre(s) (e.g. an active heave compensation drawworks, hydraulic cylinders hoisting system, crown mounted heave compensators etc.), active heave compensation systems for cranes, Dynamic Position (DP) system, Drilling Control Network (DCN), Mud control system (MCS) and similar measurements and control systems interfacing to the controller.

In some embodiments, the at least one operational equipment 300 is/are one or more selected from the group of:
- a pipe racking equipment,
- a crane or other lifting and/or hoisting equipment,
- a blowout preventer,
- at least one equipment hanging off of the drilling or work-over rig and in the water (such as in a splash zone, at certain depths such as about 10 to about 100 meters+ interval op till 3 km or beyond), near the seabed (such as about within 1 meter, within 5 meters, within 10 meters, within 20 meters, within about 50 to about 100 meters), blowout preventer, marine riser, and/or X-mas tree,
- active or passive heave compensation equipment.

The computational physics model of the rig/vessel 10 may be customised or may alternatively be based on models already used somewhere on the vessel for certain embodiments. As one example of such an existing system already incorporating a vessel 10 a model is the control system for the dynamic positioning (DP) system. Accordingly, the at least one operational control and/or state unit may in one embodiment be incorporated into the control system for the DP system. In some embodiments, the at least one operational control and/or state unit is arranged to predict maximum dynamic forces on the operational equipment based on the pattern in the sensor measurements e.g. wind, vessel motions and/or currents.

Examples of systems that may apply MRU sensors and in which the at least one operational control and/or state unit may be incorporated or connected includes Active heave compensation system for winch (s), active heave compensation system for crane(s), Crown Mounted Compensator (CMC), Active heave compensation for drawwork.

According in some examples, there is a computer-implemented method of providing operational control and/or state in a drilling or work-over rig 500, wherein the method comprises
- obtaining one or more measured physical values from at least one sensor unit 200,
- providing data representing the one or more measured physical values and/or derived values thereof to at least one operational control and/or state unit 100,
- deriving, by at least one processing unit 102, data representing an estimation of one or more physical states (such as defined by limits of forces, relative motion between operational equipment and vessel, or between other two pieces of operational equipment) estimated to act on at least one operational equipment 300 presently or within a predetermined near-future period of time in response to
  - the data representing the one or more measured physical values and/or derived values thereof as provided by the at least one sensor unit 200, and
  - a data representation of a computational physics model of at least a part of the drilling or work-over vessel stored in a memory and/or storage 103 accessible by the at least one processing unit 102.

In some embodiments, the method carries out one or more functions of a drilling or work-over rig/vessel 10 as described above.

In some examples, features and methods described above may be provided on to a computer readable medium comprising encoded instructions for carrying out the method listed above.

The at least one operational control and/or state unit 100 may e.g. also provide operational control and/or state data in response to the relative movement between one or more operational equipment 300 and the rig.

In use, and as generally described, the control system 100 can obtain data from sensor units 200, whereby that data represents measured physical values. The control system 100 can then use the computational physics model of at least part of the vessel so as to derive data representing an estimation of one or more physical states of the multiple operational equipment at the vessel.

As mentioned, the physical states of the operational equipment may provide an indication as to the operability of the operational equipment, based on data received from the sensor units 200, for example, whether, or to what extent, the operational equipment 300 may be operable within an operational window (e.g. a safe/optimal window). Further, the physical states may comprise an indication as to whether the equipment 300 is operable in normal operation; cautionary operation; reduced operation (e.g. reduced speed and/or load); stop operation; disconnect operation, or the like.

As has been described, in some examples, the physical state may be derived from an estimation as to the limits of forces experienced by certain equipment, relative motion between operational equipment and rig, or between two or more operational equipment. In similar words, the physical state may include an indication of any interaction with the other operational equipment or the vessel. In practical terms, this may mean that the physical state is based on the likelihood of clashing or bottlenecks with other equipment or the vessel. For example, this may be based on the potential clashing between a riser 70 and the moonpool 80, based on data from sensor units. It will be appreciated that the riser angle may be influenced by current. Therefore, the control system 100 may be configured to use data from sensor units 200 measuring water current and vessel motion, together with the physical model.

As highlight above also, while in some cases, the control system may provide an output indicating states in real time, it may additionally provide an indication as to the "future" physical state of operation equipment 300. For example, the future state may relate to an estimation as to the state of that equipment in a predefined time in the future, such as in 30 mins, 1 hour, 2 hours, 4 hours, 6 hours, 12 hours, or the like. This may be presented to an operator (e.g. at the control tower 50).

In doing so, the control system 100 may be configured to estimate, using the present data received from the sensor units 200 for example, the present state and/or the future state of the equipment. In some cases, additional data may be used, such a weather forecast or the like, which may help provide the estimation of future state. The control system 100 may also be configured to derive an expected duration of state for operation equipment by deriving data indicating how long a particular operational equipment is expected to remain in a particular state.

In some cases, the control system 100 may be configured to estimate, using the present data received from the sensor units together with previous data (e.g. from sensor units), one or more future physical states/duration of state of the operational equipment. In other similar words, the control system may be configured to forecast the future state based on the present data together with historical data. For example, the control system 100 may be configured to extrapolate present data and historical data in order to forecast the future state. In some cases, tidal and/or weather forecast may be used by the control system in order to predict future states.

Throughout the description, the used symbols in the drawings may have a different meaning than what they traditionally may represent. In such cases, the meaning is then the meaning as written in the description.

In the claims enumerating several features, some or all of these features may be embodied by one and the same element, component or item. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof. However, on the other hand the term "comprises/comprising" is intended to also include embodiments where the particular articles is formed entirely by the comprised features.

The invention claimed is:

1. A drilling or work-over vessel, comprising;
   sensor units configured to obtain measured physical values wherein at least some of the sensor units are configured to obtain physical values associated with the vessel itself, and to provide data representing the measured physical values, and the obtained physical values;
   multiple operational equipment configured for use in drilling or work-over operations; and
   a control system configured to receive data representing the measured physical values from the sensor units; and further configured to use a computational physics model of at least part of the vessel so as to derive data representing an estimation of one or more physical states of the operational equipment based at least in part on the data received from the sensor units;
   wherein the physical states of the multiple operational equipment are presented to an operator with a plurality of indicators wherein the plurality of indicators are configured to indicate the operability of the multiple operational equipment and the plurality of indicators indicates whether the multiple operational equipment is operable in normal operation or in one of: cautionary operation; reduced operation; stop operation; or a disconnect operation, and
   wherein at least one of the sensor units is remote from the multiple operational equipment and the control system is configured to use the computational physics model to translate data representing measured physical values at the sensor unit remote from the multiple operational equipment in order to estimate physical values experienced at a particular operational equipment.

2. The vessel according to claim 1, wherein the computational physics model comprises limitations for the operational equipment so that based on motions of the vessel and the operation at hand said indication is determined based on the computational physics model.

3. The vessel according to claim 1, wherein the control system is configured to derive data representing an optimized operation for at least one of the vessel and the operational equipment.

4. The vessel according to claim 1, wherein the control system is configured to estimate one or more future physical states of the operational equipment.

5. The vessel according to claim 1, wherein the control system is configured to estimate one or more future physical states of the operational equipment and the control unit is configured to derive the data representing at least one of an optimized operation for the vessel and an optimized operation for the operational equipment, based on the estimated future physical state.

6. The vessel according to claim 3, wherein the optimized operation defines or redefines a particular sequence of operation, a particular orientation or positional movement of the vessel.

7. The vessel according to claim 1, wherein at least one of the operational equipment is permanently installed with the vessel.

8. The vessel according to claim 1, wherein the control system is configured to use the computational physics model to derive data representing an estimation of the present physical state of the operational equipment in real time.

9. The vessel according to claim 1, wherein the control system is configured to derive data representing the physical states from an estimation as to relative motion between one or more of
   operational equipment and vessel, and
   between two or more operational equipment.

10. The vessel according to claim 9, wherein the physical state are based, at least in part, on the likelihood of equipment clashing, either with other equipment or the vessel.

11. The vessel according to claim 4, wherein, the control system is configured to derive an expected duration of state for operation equipment.

12. The vessel according to claim 4, wherein the control system is configured to estimate the future physical states of the operational equipment using present data received from the sensor units together with previous data.

13. The vessel according to claim 1, wherein the control system is further configured to use a weather forecast to derive data representing one or more future physical states of the operational equipment.

14. The vessel according to claim 1, wherein some or all of the sensor units are configured to obtain physical values associated with the vessel itself.

15. The vessel according to claim 1, wherein each of the sensor units is selected from the group of:
- a pitch and roll sensor,
- a motion reference unit,
- a gyroscope,
- an accelerometer,
- a global positioning system or other positioning sensor,
- a weather station,
- a wind sensor,
- an inertial measurement unit,
- a near surface water current measurement unit,
- a near seabed water current measurement unit,
- a Doppler water current sensor,
- a single-point water current meter,
- a water current profiler unit,
- a vessel water current sensor,
- a water current sensor located on a marine riser,
- Riser management system,
- Doppler radar,
- Data, and
- state information of control systems.

16. The vessel according to claim 1, wherein the operational equipment is one or more selected from the group of:
- pipe racking equipment,
- tubular handling equipment
- tubular guiding equipment,
- a crane,
- hoisting equipment,
- a blowout preventer,
- a Xmas tree,
- active or passive heave compensation equipment.

* * * * *